US012552631B2

(12) United States Patent
Shimizu et al.

(10) Patent No.: US 12,552,631 B2
(45) Date of Patent: Feb. 17, 2026

(54) SHEET BUNDLE BINDING APPARATUS AND ROTATION DETECTION METHOD

(71) Applicant: Horizon Inc., Takashima (JP)

(72) Inventors: Tomoyuki Shimizu, Takashima (JP); Masaru Ochi, Takashima (JP)

(73) Assignee: Horizon Inc., Takashima (JP)

( * ) Notice: Subject to any disclaimer, the term of this patent is extended or adjusted under 35 U.S.C. 154(b) by 0 days.

(21) Appl. No.: 19/018,463

(22) Filed: Jan. 13, 2025

(65) Prior Publication Data

US 2025/0243031 A1 Jul. 31, 2025

(30) Foreign Application Priority Data

Jan. 31, 2024 (JP) ................................ 2024-013613

(51) Int. Cl.
*B65H 37/04* (2006.01)
*B42B 4/00* (2006.01)
*B65H 43/00* (2006.01)

(52) U.S. Cl.
CPC ............... *B65H 37/04* (2013.01); *B42B 4/00* (2013.01); *B65H 43/00* (2013.01); *B65H 2301/51611* (2013.01); *B65H 2513/11* (2013.01)

(58) Field of Classification Search
CPC .................... B65H 37/04; B65H 43/00; B65H 2301/51611; B65H 2513/11; B42B 4/00
USPC ........................... 412/1, 6, 9, 11, 14, 25, 33
See application file for complete search history.

(56) References Cited

U.S. PATENT DOCUMENTS 4,703,881 A 11/1987 Riddell
5,042,343 A * 8/1991 Boyadjian .............. B42B 5/103 83/210
5,678,813 A 10/1997 Osako
2008/0245838 A1 10/2008 Hori et al.

FOREIGN PATENT DOCUMENTS

JP 2005074866 A 3/2005
JP 5013933 B2 8/2012

* cited by examiner

*Primary Examiner* — Justin V Lewis
(74) *Attorney, Agent, or Firm* — Dinsmore & Shohl LLP; Yongsok Choi, Esq.

(57) ABSTRACT

Provided is a saddle stitch folding apparatus including: a stitcher unit; a reel support unit configured to support a reel rotatably about the axis with a support shaft being inserted in a through-hole formed in the reel; and a rotation detecting mechanism configured to detect a rotation state of the reel, and the rotation detecting mechanism has an adhering member that is rotated while adhered to a bottom face of the reel, a rotating member having an insertion hole inserted in the support shaft, and a rotation detecting unit configured to detect the rotation state of the rotating member.

11 Claims, 8 Drawing Sheets

SHEET BUNDLE BINDING APPARATUS AND ROTATION DETECTION METHOD

This application is based on Japanese Patent Application No. 2024-013613 filed on Jan. 31, 2024, the contents of which are incorporated herein by reference in its entirety.

BACKGROUND

1. Technical Field

The present disclosure relates to a sheet bundle binding apparatus and a rotation detection method for detecting rotation of a reel used for the sheet bundle binding apparatus.

2. Description of Related Art

Sheet bundle binding apparatuses that cut a wire into a predetermined length and bends the cut wire to bind a sheet bundle are conventionally known (for example, Japanese Patent No. 5013933).

A sheet bundle binding apparatus disclosed in Japanese Patent No. 5013933 supplies a wire to a stitcher head from a reel on which the wire is wound. Japanese Patent No. 5013933 discloses that it is detected by a detector that the position of the spring plate guide that guides a wire varies when the stitcher head pulls in the wire and it is determined that there is no wire on the reel when no variation in the position of the spring plate guide is detected.

In the method of determining whether or not there is a wire on a reel by detecting variation in the position of the spring plate guide, however, there is a likelihood of erroneous detection that there is no wire on the reel despite the fact that the wire remains on the reel. For example, when the remaining amount of a wire wound on the reel is reduced, the variation in the position of the spring plate guide is reduced, and this may lead to erroneous detection that there is no wire on the reel.

Further, for example, when the method of directly detecting whether or not there is a wire is employed, the manufacturing cost of the apparatus may increase, and erroneous detection may occur because the detecting part wears due to detection of wires and the wear develops. Further, for example, when the wire runs out, the reel is no longer rotated, and it is thus conceivable to employ a method of detecting the rotation of the reel by a sensor or the like. It is however difficult to suitably detect the rotation of various shapes of reels.

The present disclosure has been made in view of the above problem and intends to provide a sheet bundle binding apparatus and a rotation detection method that can suitably detect the rotation state of a reel to recognize the remaining amount of a wire wound on the reel even when various shapes of reels are used.

BRIEF SUMMARY

To solve the above problem, the present disclosure employs the following solutions.

A sheet bundle binding apparatus according to one aspect of the present disclosure includes: a stitcher unit configured to perform a binding operation of binding a sheet bundle with a wire at a predetermined binding position; a reel support unit configured to support a reel rotatably about an axis with a support shaft extending along the axis being inserted in a through-hole formed in the reel on which the wire is wound; a rotation detecting mechanism configured to detect a rotation state of the reel; and a wire feed unit configured to perform a supply operation of unwinding the wire from the reel to supply the wire to the stitcher unit, and the rotation detecting mechanism has an adhering member rotated about the axis together with the reel while adhered to a bottom face of the reel, a rotating member connected to the adhering member rotatably about the axis together with the adhering member and having an insertion hole inserted in the support shaft, and a rotation detecting unit configured to detect the rotation state of the rotating member.

According to the sheet bundle binding apparatus of one aspect of the present disclosure, in response to the wire feed unit performing the supply operation, the wire is unwound from the reel, and the reel is rotated about the support shaft of the reel support unit. The rotation of the reel is transferred to the rotating member via the adhering member that is rotated while adhered to the bottom face of the reel. The rotation state of the rotating member is detected by the rotation detecting unit, thereby the rotation state of the reel can be suitably detected, and the remaining amount of the wire wound on the reel can be recognized even when various shapes of the reel are used.

The sheet bundle binding apparatus according to one aspect of the present disclosure may be configured such that the sheet bundle binding apparatus includes a control unit configured to control the sheet bundle binding apparatus, and during the wire feed unit performing the supply operation, when the rotation detecting mechanism detects a non-rotating state where the reel is not rotated, the control unit instructs an upstream apparatus, which transports the sheet bundle to the sheet bundle binding apparatus, to stop transport of the sheet bundle to the sheet bundle binding apparatus.

According to the sheet bundle binding apparatus of the present configuration, in the non-rotating state where the reel is not rotated, by instructing the upstream apparatus to stop transport of the sheet bundle to the sheet bundle binding apparatus, it is possible to suitably prevent the sheet bundle from being transported to the sheet bundle binding apparatus in a state where there is no wire wound on the reel.

The sheet bundle binding apparatus of the above configuration may be formed such that the rotating member has a plurality of opening holes arranged apart from each other in a circumferential direction about the insertion hole, and the rotation detecting unit is installed at a predetermined position and detects a state where the opening holes pass by the predetermined position, the opening holes passing by the predetermined position during the rotating member being rotated about the axis.

According to the sheet bundle binding apparatus of the above form, a state where the plurality of opening holes arranged in the rotating member pass by a predetermined position is detected by the rotation detecting unit, and thereby the rotation state of the reel can be recognized.

The sheet bundle binding apparatus of the above form may be embodied such that, when a state where the opening holes do not pass by the predetermined position for two or greater predetermined number of times of the supply operation is detected by the rotation detecting unit for the predetermined number of times, the control unit instructs the upstream apparatus to stop transport of the sheet bundle to the sheet bundle binding apparatus.

According to the sheet bundle binding apparatus of the present embodiment, even when a state where the opening holes do not pass by a predetermined position for one time of the supply operation is erroneously detected, it is possible to prevent the transport of the sheet bundle from the upstream apparatus to the sheet bundle binding apparatus from being stopped due to only such erroneous detection.

The sheet bundle binding apparatus of the above configuration may be formed such that the upstream apparatus is a collating machine having a plurality of sheet feed trays and a sheet feed unit that feeds sheets from each of the sheet feed trays and configured to transport the sheet bundle to the sheet bundle binding apparatus, the sheets being fed from a plurality of sheet feed trays and collated into the sheet bundle, and the control unit instructs the collating machine to stop feeding of the sheet by the sheet feed unit.

According to the sheet bundle binding apparatus of the present form, in the non-rotating state where the reel is not rotated, by instructing the collating machine to stop feeding of the sheet by the sheet feed unit, it is possible to suitably prevent the sheet bundle from being transported to the sheet bundle binding apparatus in a state where there is no wire wound on the reel.

The sheet bundle binding apparatus according to one aspect of the present disclosure may be configured to include a control unit configured to control the sheet bundle binding apparatus, and during the wire feed unit performing the supply operation, when the rotation detecting mechanism detects a rotating state where the reel is rotated, the control unit controls the stitcher unit into an operating state to perform the binding operation, and when the rotation detecting mechanism detects a non-rotating state where the reel is not rotated, the control unit controls the stitcher unit into a stop state to not perform the binding operation.

According to the sheet bundle binding apparatus of the present configuration, it is detected by the rotation detecting mechanism whether the rotation state is the rotating state where the reel is rotated or the non-rotating state where the reel is not rotated, and the stitcher unit can be suitably controlled to an operating state or a stop state.

The sheet bundle binding apparatus of the above configuration may be formed such that the rotating member has a plurality of opening holes arranged apart from each other in a circumferential direction about the insertion hole, and the rotation detecting unit is installed at a predetermined position and detects a state where the opening holes pass by the predetermined position, the opening holes passing by the predetermined position during the rotating member being rotated about the axis.

According to the sheet bundle binding apparatus of the above form, a state where the plurality of opening holes arranged in the rotating member pass by a predetermined position is detected by the rotation detecting unit, and thereby the rotation state of the reel can be recognized.

The sheet bundle binding apparatus of the above form may be embodied such that, when a state where the opening holes do not pass by the predetermined position for two or greater predetermined number of times of the supply operation is detected by the rotation detecting unit for the predetermined number of times, the control unit controls the stitcher unit into the stop state.

According to the sheet bundle binding apparatus of the present embodiment, even when a state where the opening holes do not pass by a predetermined position for one time of the supply operation is erroneously detected, it is possible to prevent the stitcher unit from being in the stop state due to only such erroneous detection.

In a rotation detection method for detecting rotation of a reel used for a sheet bundle binding apparatus according to one aspect of the present disclosure, the sheet bundle binding apparatus has a stitcher unit configured to perform a binding operation of binding a sheet bundle with a wire at a predetermined binding position, a reel support unit configured to support a reel rotatably about an axis with a support shaft extending along the axis being inserted in a through-hole formed in the reel on which the wire is wound, a rotation detecting mechanism configured to detect a rotation state of the reel, and a wire feed unit configured to perform a supply operation of unwinding the wire from the reel to supply the wire to the stitcher unit, the rotation detecting mechanism has an adhering member rotated about the axis together with the reel while adhered to a bottom face of the reel, and a rotating member connected to the adhering member rotatably about the axis together with the adhering member and having an insertion hole inserted in the support shaft, and the rotation detection method includes a rotation detecting step of detecting the rotation state of the rotating member.

According to the rotation detection method of one aspect of the present disclosure, in response to the wire feed unit performing the supply operation, the wire is unwound from the reel, and the reel is rotated about the support shaft of the reel support unit. The rotation of the reel is transferred to the rotating member via the adhering member that is rotated while adhered to the bottom face of the reel. The rotation state of the rotating member is detected by the rotation detecting step, thereby the rotation state of the reel can be suitably detected, and the remaining amount of the wire wound on the reel can be recognized even when various shapes of the reel are used.

The rotation detection method according to one aspect of the present disclosure may be configured to include an instruction step of, during the wire feed unit performing the supply operation, when the rotation detecting step detects a non-rotating state where the reel is not rotated, instructing an upstream apparatus, which transports the sheet bundle to the sheet bundle binding apparatus, to stop transport of the sheet bundle to the sheet bundle binding apparatus.

According to the rotation detection method of the present configuration, in the non-rotating state where the reel is not rotated, by instructing the upstream apparatus to stop transport of the sheet bundle to the sheet bundle binding apparatus, it is possible to suitably prevent the sheet bundle from being transported to the sheet bundle binding apparatus in a state where there is no wire wound on the reel.

The rotation detection method according to one aspect of the present disclosure may be configured to include a control step of, during the wire feed unit performing the supply operation, when the rotation detecting step detects a rotating state where the reel is rotated, controlling the stitcher unit into an operating state to perform the binding operation, and when the rotation detecting step detects a non-rotating state where the reel is not rotated, controlling the stitcher unit into a stop state to not perform the binding operation.

According to the rotation detection method of the present configuration, it is detected by the rotation detecting step whether the rotation state is the rotating state where the reel is rotated or the non-rotating state where the reel is not rotated, and the stitcher unit can be suitably controlled to an operating state or a stop state.

According to the present disclosure, it is possible to provide a sheet bundle binding apparatus and a control method of a sheet bundle binding apparatus that can suitably detect the rotation state of a reel to recognize the remaining amount of a wire wound on the reel even when various shapes of reels are used.

BRIEF DESCRIPTION OF THE SEVERAL VIEWS OF THE DRAWINGS

FIG. 5 is an arrow C-C sectional view of the rotation detecting mechanism illustrated in

FIG. 3.

DETAILED DESCRIPTION

Figure 1:
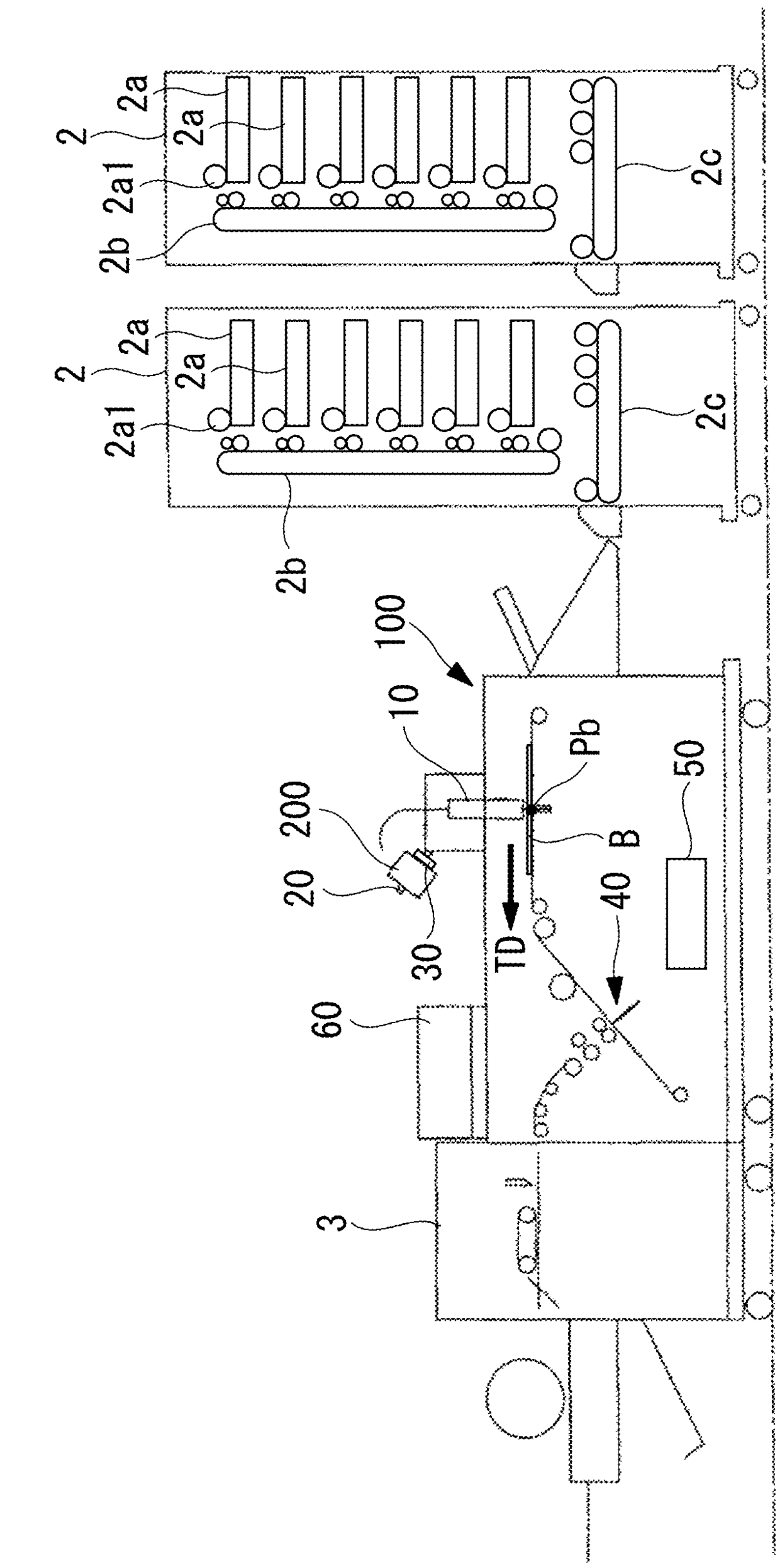
FIG. 1 is an overall view illustrating a book binding system in which a collating machine, a saddle stitch folding apparatus, and a cutting apparatus are connected to each other.

A saddle stitch folding apparatus (sheet bundle binding apparatus) 100 according to one embodiment of the present disclosure will be described below with reference to the drawings. FIG. 1 is an overall view illustrating a book binding system in which collating machines 2, a saddle stitch folding apparatus 100, and a cutting apparatus 3 are connected to each other.

As illustrated in FIG. 1, the book binding system includes the plurality of collating machines 2, the saddle stitch folding apparatus 100, and the cutting apparatus 3. Each collating machine 2 is an apparatus having a plurality of sheet feed trays 2*a* arranged in the height direction and configured to collate sheets fed from the sheet feed trays 2*a* by sheet feed rollers (sheet feed unit) 2*a*1 in the order of pages to form a sheet bundle B and transport the sheet bundle B to the saddle stitch folding apparatus 100.

The collating machine 2 transports sheets fed from each sheet feed tray 2*a* to a horizontal transport belt 2*c* from above to below in the height direction by the vertical transport belt 2*b*. As illustrated in FIG. 1, when two collating machines 2 are connected to each other, the sheet bundle B collated by the upstream collating machine 2 is transported to the horizontal transport belt 2*c* of the downstream collating machine 2, a sheet bundle B collated with another plurality of sheets is formed at the downstream collating machine 2, and this sheet bundle B is transported to the downstream saddle stitch folding apparatus 100.

The saddle stitch folding apparatus 100 makes the sheet bundle B that is a sheet bundle B bound with a wire and folded in two and then transports the bound and folded sheet bundle B to the cutting apparatus 3. The cutting apparatus 3 cuts ends of the sheet bundle B transported from the saddle stitch folding apparatus 100 to make a book.

Figure 2:
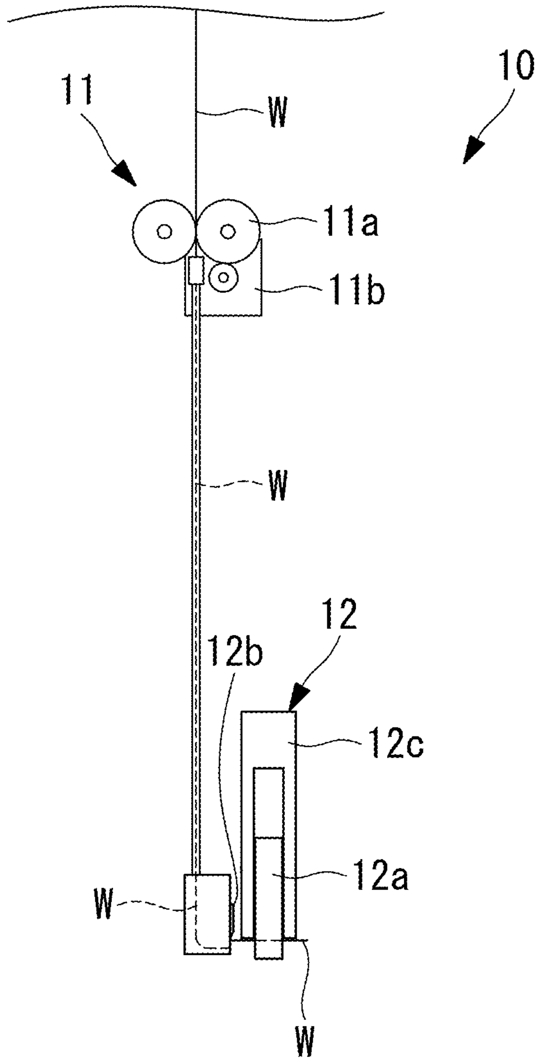
FIG. 2 is a diagram of the stitcher mechanism illustrated in FIG. 1 when viewed in a transport direction.

As illustrated in FIG. 1, the saddle stitch folding apparatus 100 includes a stitcher mechanism 10, a reel support unit 20, a rotation detecting mechanism 30, a folding mechanism 40, a control unit 50, and an operation panel 70. The stitcher mechanism 10 will now be described with reference to FIG. 2. FIG. 2 is a diagram of the stitcher mechanism 10 illustrated in FIG. 1 when viewed in a transport direction TD.

As illustrated in FIG. 2, the stitcher mechanism 10 has a wire feed unit 11 and a stitcher unit 12. The wire feed unit 11 performs a supply operation of unwinding a wire W from a reel 200 supported by the reel support unit 20 and supplies the wire W to the stitcher unit 12.

The wire feed unit 11 includes a pair of feed rollers 11*a* and a roller drive unit 11*b*. The pair of feed rollers 11*a* are rotated by drive force transferred from the roller drive unit 11*b* and supply the wire W to the stitcher unit 12. Note that, as the structure of the wire feed unit 11, another different structure than that illustrated in FIG. 2 may be employed.

The stitcher unit 12 has a wire holder 12*a*, a cutter 12*b*, and a wire-driving unit 12*c*. The wire holder 12*a* is a device that holds the wire W supplied from the wire feed unit 11. The cutter 12*b* is a device that cuts the wire W held by the wire holder 12*a*. The wire-driving unit 12*c* is a device that drives the wire W held by the wire holder 12*a* into the sheet bundle B and binds the sheet bundle B. In such a way, the stitcher unit 12 performs a binding operation of binding the sheet bundle B with the wire W at a predetermined binding position Pb (see FIG. 1).

Figure 3:
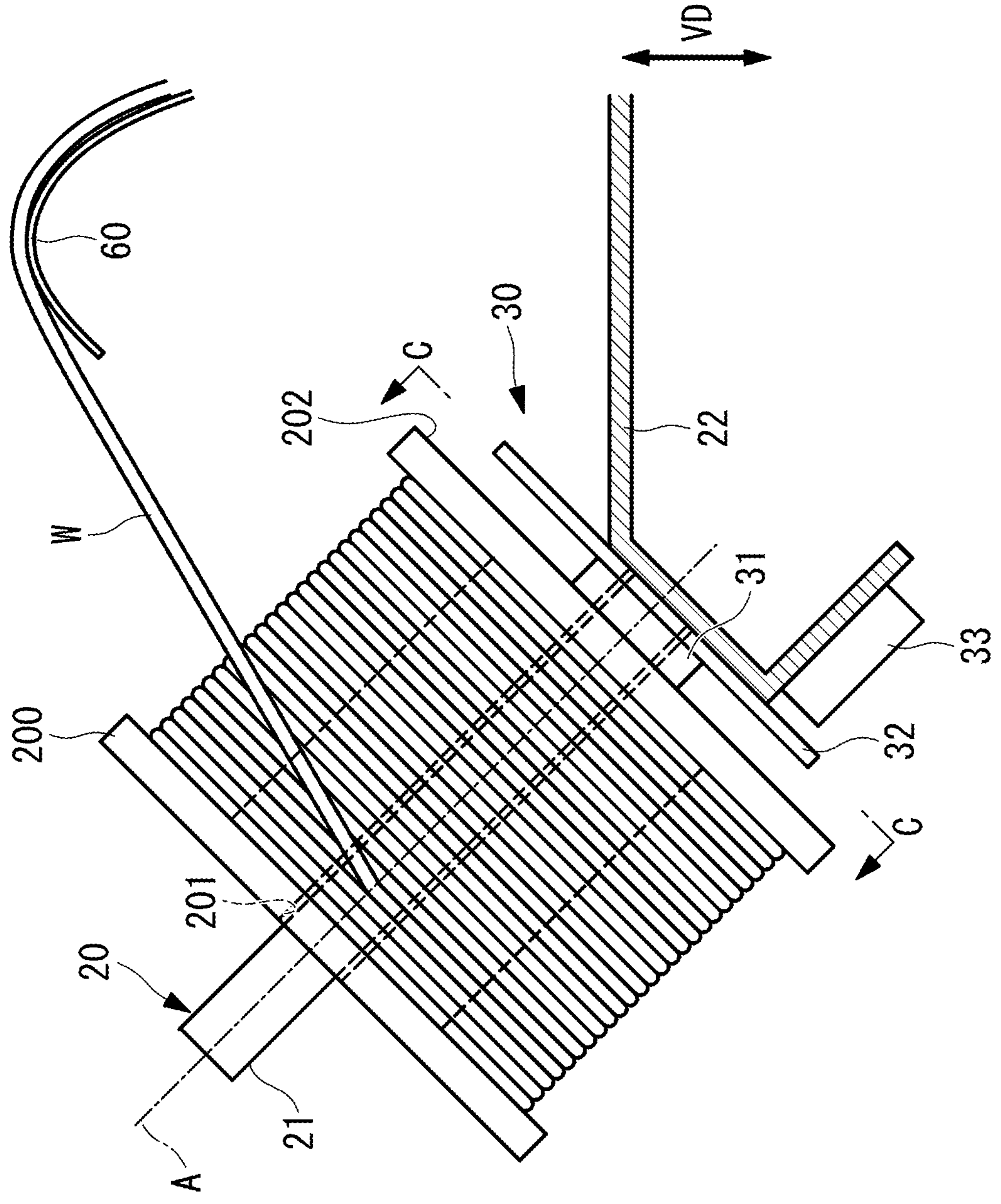
FIG. 3 is a side view illustrating a reel support unit and a rotation detecting mechanism and illustrates a state where a wire is supplied from a reel to the stitcher mechanism.
Figure 4:
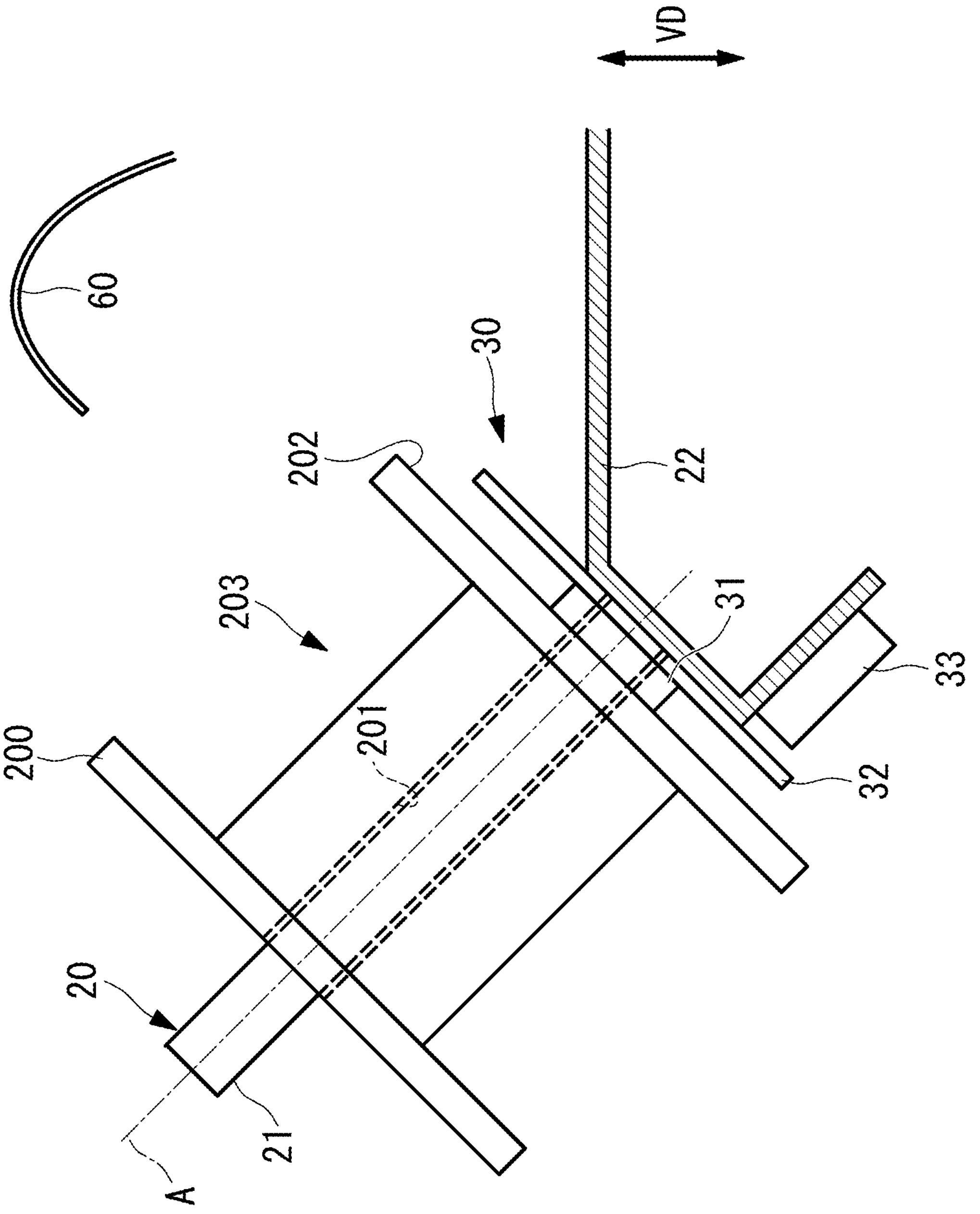
FIG. 4 is a side view illustrating the reel support unit and the rotation detecting mechanism and illustrates a state where a wire is not supplied from the reel to the stitcher mechanism.
Figure 5:
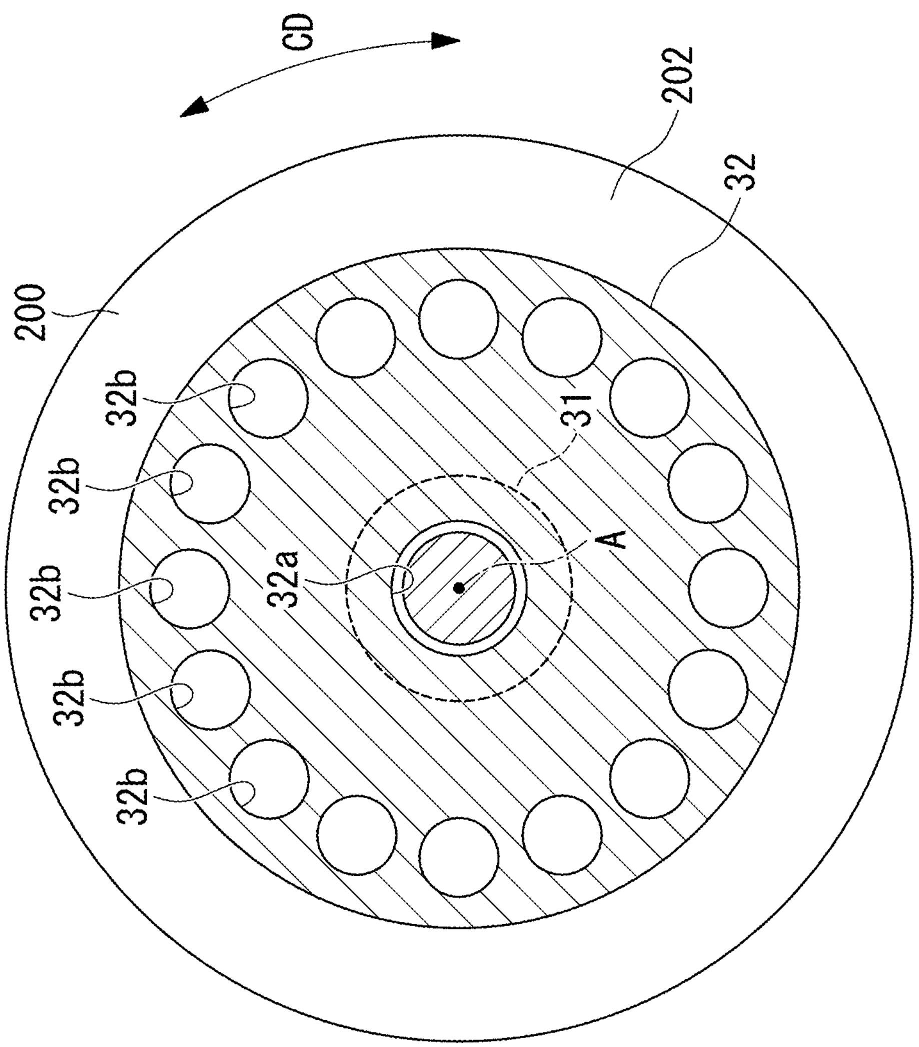

Next, the reel support unit 20 that supports the reel 200 and the rotation detecting mechanism 30 that detects rotation of the reel 200 will be described with reference to FIG. 3 to FIG. 5. FIG. 3 is a side view illustrating the reel support unit 20 and the rotation detecting mechanism 30 and illustrates a state where the wire W is supplied from the reel 200 to the stitcher mechanism 10. FIG. 4 is a side view illustrating the reel support unit 20 and the rotation detecting mechanism 30 and illustrates a state where the wire W is not supplied from the reel 200 to the stitcher mechanism 10. FIG. 5 is an arrow C-C sectional view of the rotation detecting mechanism 30 illustrated in FIG. 3.

The reel support unit 20 has a support shaft 21 extending along an axis A and a fixing part 22 for fixing the support shaft 21 to the casing of the saddle stitch folding apparatus 100. The reel support unit 20 is a device that supports the reel 200 rotatable about the axis A with the support shaft 21 being inserted in a through-hole 201 formed in the reel 200 on which the wire W is wound.

The reel 200 is a member on which the wire W is wound, which is formed cylindrically extending along the axis A. The reel 200 has a bottom face 202 arranged below in the vertical direction VD and being in contact with an adhering member (suction member) 31 of the rotation detecting mechanism 30 and a recess 203 in which the wire W is wound.

The rotation detecting mechanism 30 is a device that detects the rotation state of the reel 200. As illustrated in FIG. 3, when the wire W is wound on the reel 200, a state where the wire W wound on the reel 200 is guided by a guide 60 and supplied to the stitcher mechanism 10 is obtained. In such a case, when the wire feed unit 11 of the stitcher mechanism 10 performs a supply operation of supplying the wire W to the stitcher unit 12, a part of the wire W wound on the reel 200 is unwound. When the wire W is unwound from the reel 200, the reel 200 is rotated about the axis A.

On the other hand, as illustrated in FIG. 4, when no wire W is wound on the reel 200, even when the wire feed unit 11 of the stitcher mechanism 10 performs the supply operation of supplying the wire W to the stitcher unit 12, the reel 200 is not rotated about the axis A. During the wire feed unit 11 performing the supply operation of supplying the wire W to the stitcher unit 12, the rotation detecting mechanism 30 can detect whether or not the wire W wound on the reel 200 is present by detecting the rotation state of the reel 200.

As illustrated in FIG. 3 and FIG. 4, the rotation detecting mechanism 30 has an adhering member 31, a rotating member 32, and a rotation detecting unit 33. The adhering member 31 is a member rotated about the axis A together with the reel 200 while adhered to (sucked to) the bottom face 202 of the reel 200. As illustrated in FIG. 5, the adhering member 31 is formed annularly about the axis A.

For example, the adhering member 31 is preferably formed of a rubber material as a whole in order to generate sufficient frictional force that does not cause sliding with the bottom face 202 of the reel 200. As illustrated in FIG. 3 and FIG. 4, the adhering member 31 is in contact with the bottom face 202 of the reel 200 above in the vertical direction VD and inserted in the support shaft 21 in a manner in contact with the rotating member 32 below in the vertical direction VD.

The adhering member 31 can be arranged above in the vertical direction VD of the rotating member 32 in contact with the rotating member 32 when generating sufficient frictional force that does not cause sliding with the rotating member 32. Further, the adhering member 31 may be joined to the rotating member 32 by an adhesive agent or the like so as not to generate sliding with the rotating member 32. Note that, when the adhering member 31 is joined to the rotating member 32, a portion of the adhering member 31 in contact with the bottom face 202 of the reel 200 may be formed of a rubber material, and the remaining portion may be formed of another material (for example, a resin material) that differs from the rubber material.

The rotating member 32 is a plate-like member connected to the adhering member 31 rotatably about the axis A together with the adhering member 31 and having an insertion hole 32*a* inserted in the support shaft 21. As illustrated in FIG. 5, the rotating member 32 has a plurality of opening holes 32*b* arranged apart from each other in the circumferential direction CD about the insertion hole 32*a*.

The rotation detecting unit 33 is a device that detects the rotation state of the rotating member 32 about the axis A. As illustrated in FIG. 3, the rotation detecting unit 33 is installed to the fixing part 22 so as to detect a predetermined position at which the opening holes 32*b* pass by during the rotating member 32 being rotated about the axis A. The rotation detecting unit 33 detects a state where the opening holes 32*b* pass by the predetermined position as a rotating state.

For example, the rotation detecting unit 33 is a sensor that is in a first output state at a time the portion where the opening hole 32*b* is formed passes by a predetermined position and is in a second output state at a time the position where the opening hole 32*b* is not formed passes by the predetermined position. The rotation detecting unit 33 transfers the first output state or the second output state to the control unit 50.

During the wire feed unit 11 performing the supply operation of supplying the wire W to the stitcher unit 12, when the wire W is present on the reel 200, the rotation detecting unit 33 is in a state to alternatingly repeat the first output state and the second output state, because the rotating member 32 is rotated about the axis A together with the reel 200. In contrast, when the wire W is not present on the reel 200, the rotation detecting unit 33 remains in either the first output state or the second output state, because the reel 200 and the rotating member 32 are not rotated about the axis A.

Figure 6:
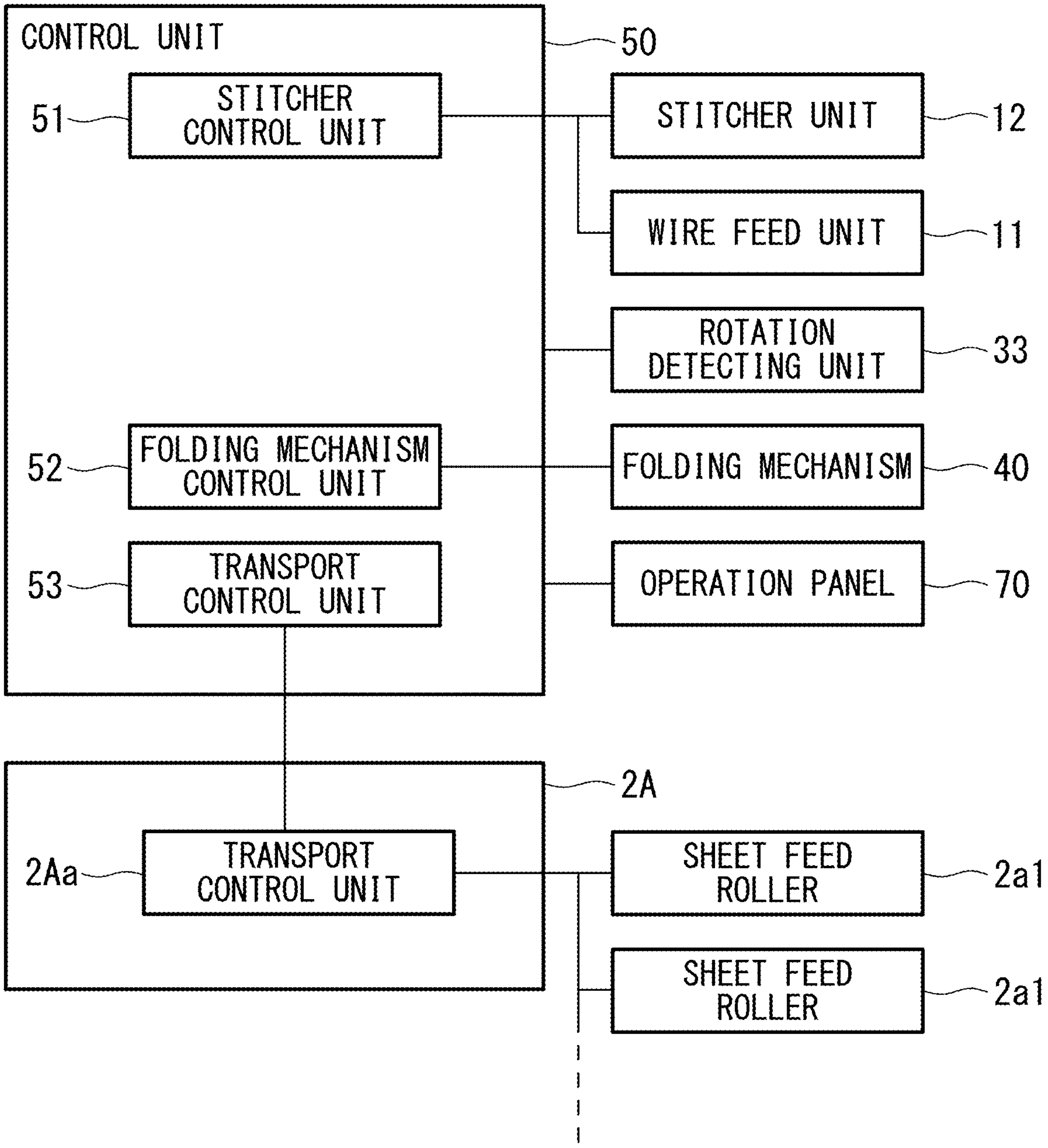
FIG. 6 is a block diagram illustrating a control configuration of the saddle stitch folding apparatus.

Next, the control unit 50 will be described with reference to FIG. 6. FIG. 6 is a block diagram illustrating a control configuration of the saddle stitch folding apparatus and the collating machine 2. The control unit 50 is a device that controls the saddle stitch folding apparatus 100 including the stitcher unit 12 and the wire feed unit 11.

As illustrated in FIG. 6, the control unit 50 has a stitcher control unit 51 that controls the stitcher unit 12 and the wire feed unit 11, a folding mechanism control unit 52 that controls the folding mechanism 40, and a transport control unit 53. An output signal indicating the first output state or the second output state detected by the rotation detecting unit 33 is transferred to the stitcher control unit 51.

A control unit 2A is a device that controls the collating machine (upstream apparatus) 2 arranged upstream of the saddle stitch folding apparatus 100 in the transport direction TD and has a transport control unit 2Aa that controls the sheet feed roller 2*a*1 configured to feed a plurality of sheets from a plurality of sheet feed trays 2*a*, and these sheets are the sheet bundles B to be transported to the saddle stitch folding apparatus 100. When the saddle stitch folding apparatus 100 receives the sheet bundle B from the collating machine 2 and is ready for performing a saddle stitch folding process including a binding process performed by the stitcher unit 12, the transport control unit 53 of the saddle stitch folding apparatus 100 transfers, to the transport control unit 2Aa, a transport permission signal that permits transport of the sheet bundle B from the collating machine 2 to the saddle stitch folding apparatus 100.

The transport control unit 2Aa performs control to transport the sheet bundle B from the collating machine 2 to the saddle stitch folding apparatus 100 when having received the transport permission signal from the transport control unit 53 and performs control not to transport the sheet bundle B from the collating machine 2 to the saddle stitch folding apparatus 100 when not having received the transport permission signal from the transport control unit 53.

Figure 7:
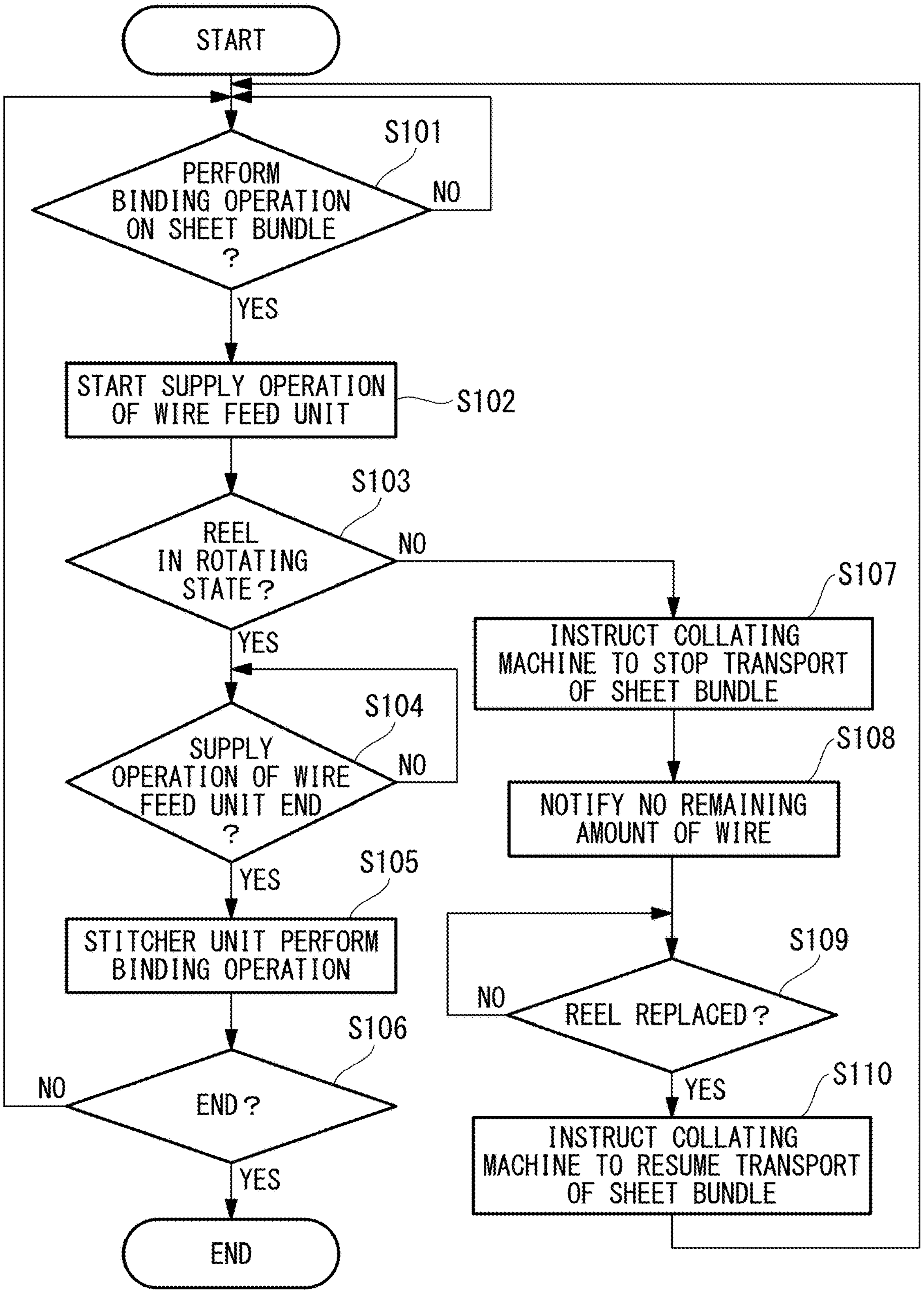
FIG. 7 is a flowchart illustrating a control method of the saddle stitch folding apparatus.

Next, the control method of the saddle stitch folding apparatus 100 of the present embodiment will be described with reference to FIG. 7. FIG. 7 is a flowchart illustrating the control method of the saddle stitch folding apparatus 100. Each process illustrated in FIG. 7 is performed by a control program stored in the control unit 50.

In step S101, the control unit 50 determines whether or not to perform a binding operation on the sheet bundle B, and the control unit 50 proceeds with the process to step S102 if the determination is YES or repeats the process of step S101 if the determination is NO.

In step S102, the stitcher control unit 51 controls the wire feed unit 11 to start a supply operation of unwinding the wire W from the reel 200 to supply the wire W to the stitcher unit 12.

In step S103, based on the output signal transferred from the rotation detecting unit 33, the control unit 50 determines whether the rotation detecting unit 33 detects a rotating state where the reel 200 is rotated about the axis A or whether the rotation detecting unit 33 detects a non-rotating state where the reel 200 is not rotated about the axis A. The control unit 50 proceeds with the process to step S104 if the rotation detecting unit 33 detects the rotating state or proceeds with the process to step S107 if the rotation detecting unit 33 detects the non-rotating state.

When the output signal output from the rotation detecting unit 33 is in a state where the first output state and the second output state are repeated, this means that the rotation detecting unit 33 continuously detects the opening holes 32*b* passing by a predetermined position, and therefore, the control unit 50 determines that the rotation detecting unit 33 detects the rotation state. Further, when the output signal output from the rotation detecting unit 33 does not change remaining in the first output state or the second output state, this means that the rotation detecting unit 33 does not continuously detect the opening holes 32*b* passing by the predetermined position, and therefore, the control unit 50 determines that the rotation detecting unit 33 detects the non-rotating state.

Note that, although the control unit 50 proceeds with the process to step S107 if the rotation detecting unit 33 detects the non-rotating state in step S103 described above, the control may be of other manners. For example, the control unit 50 may perform control to proceed with the process to step S107 when a state where the opening holes 32*b* do not pass by a predetermined position for two or greater predetermined number of times of the supply operation of the wire feed unit 11 is detected by the rotation detecting unit 33 for a predetermined number of times.

For example, when the predetermined number of times is three, even when the rotation detecting unit 33 detects the state where the opening holes 32*b* do not pass by a predetermined position for consecutive two times for two times of the supply operation of the wire feed unit 11, the control unit 50 determines YES in step S103. In contrast, when the rotation detecting unit 33 detects the state where the opening holes 32*b* do not pass by a predetermined position for consecutive three times for three times of the supply operation of the wire feed unit 11, the stitcher control unit 51 determines NO in step S103.

In step S104, the stitcher control unit 51 determines whether or not the supply operation of unwinding the wire W from the reel 200 to supply the wire W to the stitcher unit 12 ends, and the stitcher control unit 51 proceeds with the process to step S105 if the determination is YES or repeats the determination of step S104 if the determination is NO.

In step S105, the stitcher control unit 51 controls the stitcher unit 12 so that the stitcher unit 12 performs a binding operation on the sheet bundle B. When the rotation detecting unit 33 detects the rotating state, the stitcher control unit 51 applies an operation state where the stitcher unit 12 performs the binding operation.

In step S106, the control unit 50 checks whether or not there is a sheet bundle B subsequently transported from collating machine 2. If there is no sheet bundle B subsequently transported from collating machine 2, the control unit 50 determines to terminate the process of the present flowchart and ends the process of the present flowchart. If there is a sheet bundle B subsequently transported from collating machine 2, the control unit 50 again performs the process of step S101 and the subsequent steps.

In step S107, if the rotation detecting mechanism 30 detects the non-rotating state where the reel 200 is not rotated during the wire feed unit 11 performing the supply operation, the transport control unit 53 instructs the collating machine 2 that transports the sheet bundles B to the saddle stitch folding apparatus 100 to stop transport of the sheet bundle B to the saddle stitch folding apparatus 100. The transport control unit 53 performs control not to transfer the transport permission signal, which permits transport of the sheet bundle B from the collating machine 2 to the saddle stitch folding apparatus 100, to the transport control unit 2Aa.

Since no transport permission signal is transferred, the transport control unit 2Aa of the collating machine 2 performs control to stop feeding of sheets by the sheet feed roller 2*a*1 so as not to transport the sheet bundle B to the saddle stitch folding apparatus 100. When no transport permission signal is transferred from the saddle stitch folding apparatus 100, the collating machine 2 stops feeding of sheets by the sheet feed roller 2*a*1 and stops the operation after transporting the already collated sheet bundle B by the horizontal transport belt 2*c* to the saddle stitch folding apparatus 100. In such a way, the transport control unit 53 performs control not to transfer the transport permission signal to the transport control unit 2Aa and stops collation and transport of the sheet bundle B subsequent to the already collated sheet bundle B.

In step S108, because of the non-rotating state where the reel 200 is not rotated about the axis A, the control unit 50 notifies the operator that there is no remaining amount of the wire W. For example, the control unit 50 displays that there is no remaining amount of the wire W on the operation panel 70 connected to the control unit 50 to urge the operator to replace the reel 200.

In step S109, the control unit 50 determines whether or not the reel 200 has been replaced, and the control unit 50 proceeds with the process to step S110 if the determination is YES or repeats the determination of the step S109 if the determination is NO. For example, when there is operator input via an operation panel (not illustrated) indicating that the reel 200 has been replaced, the control unit 50 determines that the reel 200 has been replaced and proceeds with the process to step S110.

In step S110, the transport control unit 53 instructs the collating machine 2 to resume transport of the sheet bundle B to the saddle stitch folding apparatus 100 from the collating machine 2 that was stopped in step S107. The transport control unit 53 performs control to transfer the transport permission signal, which permits transport of the sheet bundle B from the collating machine 2 to the saddle stitch folding apparatus 100, to the transport control unit 2Aa. Since the transport permission signal is transferred, the transport control unit 2Aa of the collating machine 2 performs control to resume the sheet feeding by the sheet feed roller 2*a*1 in order to transport the sheet bundle B to the saddle stitch folding apparatus 100. After performing steps S110, the control unit 50 repeats performing the process of step S101 and the subsequent steps.

Note that, in step S103, when the rotation detecting unit 33 detects the non-rotating state, since the sheet bundle B is not transported from the collating machine 2, the control unit 50 does not perform the binding operation of the stitcher unit 12 of step S105.

Note that, although, in the above description, the control unit 50 instructs the collating machine 2 that transports the sheet bundles B to the saddle stitch folding apparatus 100 to stop transport of the sheet bundle B to the saddle stitch folding apparatus 100 if the rotation detecting mechanism 30 detects the non-rotating state where the reel 200 is not rotated during the wire feed unit 11 performing the supply operation, another modified example may be employed. For example, during the wire feed unit 11 performing the supply operation, if the rotation detecting mechanism 30 detects the rotating state where the reel 200 is rotated, the control unit 50 may control the stitcher unit 12 into an operation state to perform the binding operation, and if the rotation detecting mechanism 30 detects the non-rotating state where the reel 200 is not rotated, the control unit 50 may control the stitcher unit 12 into a stop state to not perform the binding operation.

Figure 8:
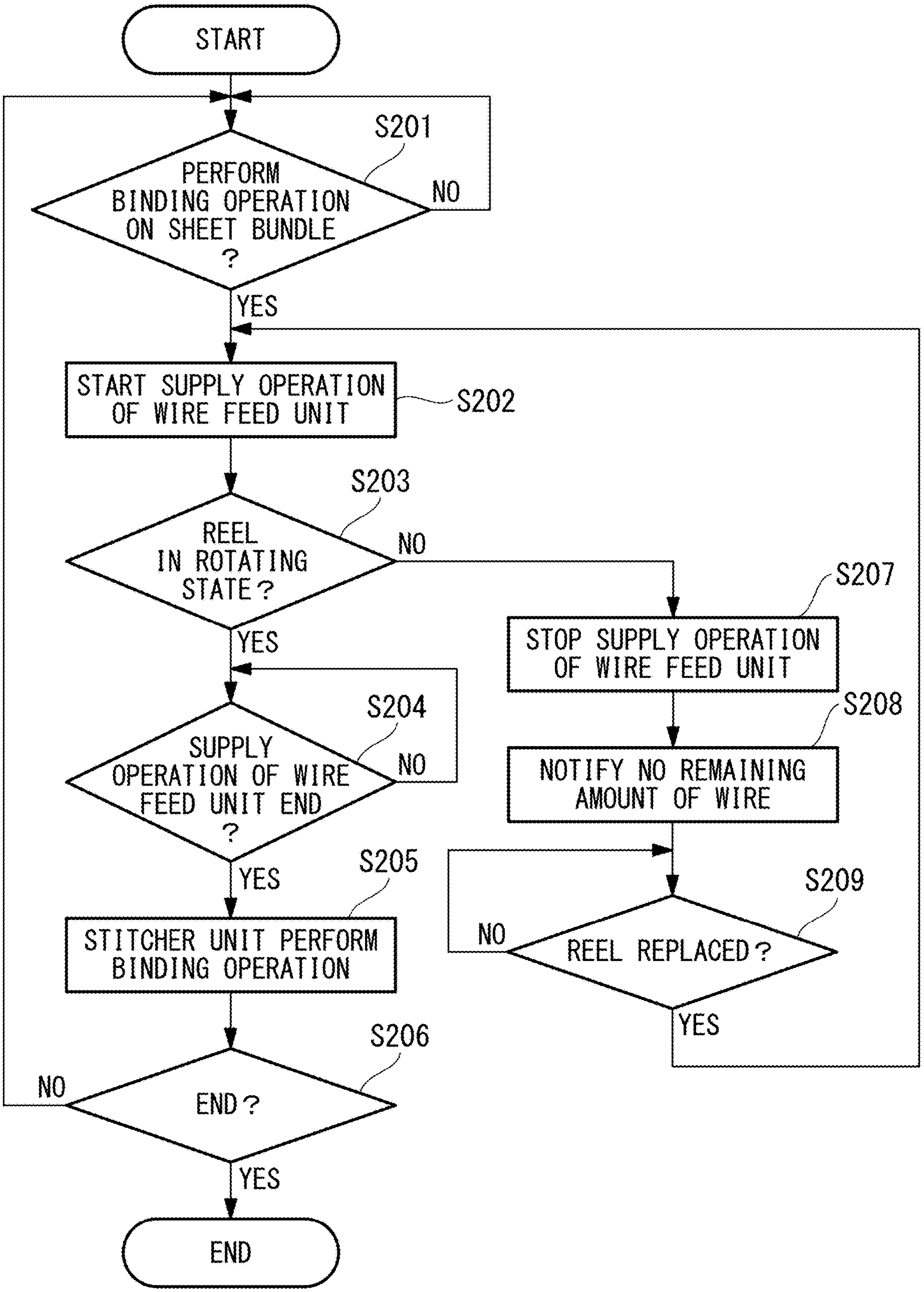
FIG. 8 is a flowchart illustrating a modified example for the control method of the saddle stitch folding apparatus.

FIG. 8 is a flowchart illustrating a modified example for the control method of the saddle stitch folding apparatus 100. Since step S201 to step S206 and step S208 to step S209 illustrated in FIG. 8 are the same as step S101 to step S106 and step S108 to step S109 illustrated in FIG. 7, the description thereof will be omitted below. The modified example illustrated in FIG. 8 differs from the above embodiment in that there is no process corresponding to step S107 and step S110 illustrated in FIG. 7 and the process of step S207 is added.

In step S207, since the reel 200 is the non-rotating state, the stitcher control unit 51 controls the wire feed unit 11 to stop the supply operation of unwinding the wire W from the reel 200 to supply the wire W to the stitcher unit 12.

In the modified example illustrated in FIG. 8, during the wire feed unit 11 performing the supply operation, if the rotation detecting mechanism 30 detects the rotating state where the reel 200 is rotated, the stitcher control unit 51 controls the stitcher unit 12 into an operation state to perform the binding operation, and if the rotation detecting mechanism 30 detects the non-rotating state where the reel 200 is not rotated, the stitcher control unit 51 controls the stitcher unit 12 into a stop state to not perform the binding operation.

Further, although, in the above description, the control unit 50 notifies the operator via the operation panel 70 that there is no remaining amount of the wire W in a case of the non-rotating state where the reel 200 is not rotated even when the wire feed unit 11 performs the supply operation, the following operation may be further performed. For example, the control unit 50 may display the level of the remaining amount of the wire W on the operation panel 70 based on the output signal transferred from the rotation detecting unit 33.

As illustrated in FIG. 3 and FIG. 4, when the remaining amount of the wire W wound on the reel 200 is large, the wire W is unwound from a position distant from the axis A, and when the remaining amount of the wire W wound on the reel 200 is small, the wire W is unwound from a position close to the axis A. Thus, when the remaining amount of the wire W wound on the reel 200 is large, the frequency that the rotation detecting mechanism 30 detects the opening holes 32*b* is low, and when the remaining amount of the wire W wound on the reel 200 is small, the frequency that the rotation detecting mechanism 30 detects the opening holes 32*b* is high.

Accordingly, the control unit 50 can store in advance, as a table, the relationship between the frequency that the rotation detecting mechanism 30 detects the opening holes 32*b* and the remaining amount of the wire W, reference the table to recognize the level of the remaining amount of the wire W from the frequency that the rotation detecting mechanism 30 detects the opening holes 32*b*, and display the level of the remaining amount of the wire W on the operation panel 70.

The effects and advantages achieved by the saddle stitch folding apparatus 100 of the present embodiment described above will be described.

According to the saddle stitch folding apparatus 100 of the present embodiment, in response to the wire feed unit 11 performing the supply operation, the wire W is unwound from the reel 200, and the reel 200 is rotated about the support shaft 21 of the reel support unit 20. The rotation of the reel 200 is transferred to the rotating member 32 via the adhering member 31 that is rotated while adhered to the bottom face 202 of the reel 200. The rotation state of the rotating member 32 is detected by the rotation detecting unit 33, thereby the rotation state of the reel 200 can be suitably detected, and the remaining amount of the wire W wound on the reel 200 can be recognized even when various shapes of the reel 200 are used.

According to the saddle stitch folding apparatus 100 of the present embodiment, in the non-rotating state where the reel 200 is not rotated, by instructing the collating machine 2 to stop transport of the sheet bundle B to the saddle stitch folding apparatus 100, it is possible to suitably prevent the sheet bundle B from being transported to the saddle stitch folding apparatus 100 in a state where there is no wire W wound on the reel 200.

According to the saddle stitch folding apparatus 100 of the present embodiment, even when a state where the opening holes 32*b* do not pass by a predetermined position for one time of the supply operation is erroneously detected, it is possible to prevent the transport of the sheet bundle B from the collating machine 2 to the saddle stitch folding apparatus 100 from being stopped due to only such erroneous detection.

According to the saddle stitch folding apparatus 100 of the present embodiment, it is detected by the rotation detecting mechanism 30 whether the rotation state is the rotating state where the reel 200 is rotated or the non-rotating state where the reel 200 is not rotated, and the stitcher unit 12 can be suitably controlled to the operating state or the stop state.

According to the saddle stitch folding apparatus 100 of the present embodiment, even when a state where the opening holes 32*b* do not pass by a predetermined position for one time of the supply operation is erroneously detected, it is possible to prevent the stitcher unit 12 from being in the stop state due to only such erroneous detection.

According to the saddle stitch folding apparatus 100 of the present embodiment, a state where the plurality of opening holes 32*b* arranged in the rotating member 32 pass by a predetermined position is detected by the rotation detecting unit 33, and thereby the rotation state of the reel 200 can be recognized.

What is claimed is:

1. A sheet bundle binding apparatus comprising:

a stitcher unit configured to perform a binding operation of binding a sheet bundle using a wire at a predetermined binding position;

a reel support unit configured to support a reel rotatably about an axis with a support shaft extending along the axis being inserted in a through-hole formed in the reel on which the wire is wound;

a rotation detecting mechanism configured to detect a rotation state of the reel; and a wire feed unit configured to perform a supply operation of unwinding the wire from the reel to supply the wire to the stitcher unit, wherein the rotation detecting mechanism has an adhering member rotated about the axis together with the reel while adhered to a bottom face of the reel, a rotating member connected to the adhering member rotatably about the axis together with the adhering member and having an insertion hole into which the support shaft is inserted, and a rotation detecting unit configured to detect a rotation state of the rotating member.

2. The sheet bundle binding apparatus according to claim 1 further comprising a control unit configured to control the sheet bundle binding apparatus, wherein during the wire feed unit performing the supply operation, when the rotation detecting mechanism detects a non-rotating state where the reel is not rotated, the control unit instructs an upstream apparatus, which transports the sheet bundle to the sheet bundle binding apparatus, to stop transport of the sheet bundle to the sheet bundle binding apparatus.

3. The sheet bundle binding apparatus according to claim 2, wherein the rotating member has a plurality of opening holes arranged apart from each other in a circumferential direction about the insertion hole, and wherein the rotation detecting unit is installed at a predetermined position and detects a state where the opening holes pass by the predetermined position, the opening holes passing by the predetermined position during the rotating member being rotated about the axis.

4. The sheet bundle binding apparatus according to claim 3, wherein when a state where the opening holes do not pass by the predetermined position for two or greater predetermined number of times of the supply operation is detected by the rotation detecting unit for the predetermined number of times, the control unit instructs the upstream apparatus to stop transport of the sheet bundle to the sheet bundle binding apparatus.

5. The sheet bundle binding apparatus according to claim 2, wherein the upstream apparatus is a collating machine having a plurality of sheet feed trays and a sheet feed unit that feeds sheets from each of the sheet feed trays and configured to transport the sheet bundle to the sheet bundle binding apparatus, the sheets being fed from the plurality of sheet feed trays and collated into the sheet bundle, and wherein the control unit instructs the collating machine to stop feeding of the sheet by the sheet feed unit.

6. The sheet bundle binding apparatus according to claim 1 further comprising a control unit configured to control the sheet bundle binding apparatus, wherein during the wire feed unit performing the supply operation, when the rotation detecting mechanism detects a rotating state where the reel is rotated, the control unit controls the stitcher unit into an operating state to perform the binding operation, and when the rotation detecting mechanism detects a non-rotating state where the reel is not rotated, the control unit controls the stitcher unit into a stop state to not perform the binding operation.

7. The sheet bundle binding apparatus according to claim 6, wherein the rotating member has a plurality of opening holes arranged apart from each other in a circumferential direction about the insertion hole, and wherein the rotation detecting unit is installed at a predetermined position and detects a state where the opening holes pass by the predetermined position, the opening holes passing by the predetermined position during the rotating member being rotated about the axis.

8. The sheet bundle binding apparatus according to claim 7, wherein when a state where the opening holes do not pass by the predetermined position for two or greater predetermined number of times of the supply operation is detected by the rotation detecting unit for the predetermined number of times, the control unit controls the stitcher unit into the stop state.

9. A rotation detection method for detecting rotation of a reel used for a sheet bundle binding apparatus, wherein the sheet bundle binding apparatus has a stitcher unit configured to perform a binding operation of binding a sheet bundle using a wire at a predetermined binding position;

a reel support unit configured to support a reel rotatably about an axis with a support shaft extending along the axis being inserted in a through-hole formed in the reel on which the wire is wound;

a rotation detecting mechanism configured to detect a rotation state of the reel; and a wire feed unit configured to perform a supply operation of unwinding the wire from the reel to supply the wire to the stitcher unit, wherein the rotation detecting mechanism has an adhering member rotated about the axis together with the reel while adhered to a bottom face of the reel, and a rotating member connected to the adhering member rotatably about the axis together with the adhering member and having an insertion hole into which the support shaft is inserted, the rotation detection method comprising a rotation detecting step of detecting a rotation state of the rotating member.

10. The rotation detection method according to claim 9 further comprising an instruction step of, during the wire feed unit performing the supply operation, when the rotation detecting step detects a non-rotating state where the reel is not rotated, instructing an upstream apparatus, which transports the sheet bundle to the sheet bundle binding apparatus, to stop transport of the sheet bundle to the sheet bundle binding apparatus.

11. The rotation detection method according to claim 9 further comprising a control step of, during the wire feed unit performing the supply operation, when the rotation detecting step detects a rotating state where the reel is rotated, controlling the stitcher unit into an operating state to perform the binding operation, and when the rotation detecting step detects a non-rotating state where the reel is not rotated, controlling the stitcher unit into a stop state to not perform the binding operation.

* * * * *